US010990073B2

(12) United States Patent
Ogawa

(10) Patent No.: US 10,990,073 B2
(45) Date of Patent: Apr. 27, 2021

(54) PROGRAM EDITING DEVICE, PROGRAM EDITING METHOD, AND COMPUTER READABLE MEDIUM

(71) Applicant: MITSUBISHI ELECTRIC CORPORATION, Tokyo (JP)

(72) Inventor: Tomotaka Ogawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 63 days.

(21) Appl. No.: 16/315,109

(22) PCT Filed: Aug. 30, 2016

(86) PCT No.: PCT/JP2016/075360
§ 371 (c)(1),
(2) Date: Jan. 3, 2019

(87) PCT Pub. No.: WO2018/042520
PCT Pub. Date: Mar. 8, 2018

(65) Prior Publication Data
US 2020/0012250 A1    Jan. 9, 2020

(51) Int. Cl.
*G06F 9/44*        (2018.01)
*G06F 11/36*       (2006.01)
(Continued)

(52) U.S. Cl.
CPC ......... *G05B 19/056* (2013.01); *G05B 19/054* (2013.01); *G06F 8/315* (2013.01);
(Continued)

(58) Field of Classification Search
CPC ... G06F 8/34; G06F 8/51; G06F 8/315; G06F 9/455; G06F 11/263; G06F 11/0775;
(Continued)

(56) References Cited

U.S. PATENT DOCUMENTS 5,119,318 A * 6/1992 Paradies ............... G06N 5/04
706/52
5,481,741 A * 1/1996 McKaskle ............. G06T 1/20
345/522
(Continued)

FOREIGN PATENT DOCUMENTS

CN    103760965 A    4/2014
DE    10116809 A1    5/2002
(Continued)

OTHER PUBLICATIONS

Vitaly Chipounov et al., In-Vivo Multi-Path Analysis of Software Systems, Mar. 5-11, 2011, [Retrieved on Dec. 1, 2020]. Retrieved from the internet: <URL: https://dl.acm.org/doi/pdf/10.1145/1961296.1950396> 14 Pages (265-278) (Year: 2011).*
(Continued)

*Primary Examiner* — Anibal Rivera
(74) *Attorney, Agent, or Firm* — Birch, Stewart, Kolasch & Birch, LLP

(57) ABSTRACT

An inter-variable dependency analyzing unit analyzes a relation between an argument and a return value between instructions of a plurality of instructions included in a sequence control program, which is a control program written in a language for sequence control. A PLC instruction sorting/division unit at least either changes an instruction execution order of the plurality of instructions or divides the sequence control program in units of instructions, based on the relation between the argument and the return value between the instructions analyzed by the inter-variable dependency analyzing unit.

7 Claims, 11 Drawing Sheets

(51) Int. Cl.
  *G05B 19/05* (2006.01)
  *G06F 8/30* (2018.01)
  *G06F 8/34* (2018.01)
  *G06F 11/32* (2006.01)
  *G06F 8/51* (2018.01)
  *G06F 11/263* (2006.01)
  *G05B 19/418* (2006.01)

(52) U.S. Cl.
  CPC .............. *G06F 8/34* (2013.01); *G05B 19/052* (2013.01); *G05B 19/418* (2013.01); *G06F 8/51* (2013.01); *G06F 11/263* (2013.01); *G06F 11/323* (2013.01)

(58) Field of Classification Search
  CPC ... G06F 11/323; G05B 19/056; G05B 19/054; G05B 19/052; G05B 19/4155; G05B 19/418
  See application file for complete search history.

(56) References Cited

U.S. PATENT DOCUMENTS

| | | | | |
|---|---|---|---|---|
| 5,717,588 | A * | 2/1998 | Yamane | G05B 19/056 700/86 |
| 5,963,726 | A * | 10/1999 | Rust | G06F 9/455 703/13 |
| 6,085,156 | A * | 7/2000 | Rust | G05B 19/4185 702/91 |
| 6,198,480 | B1 * | 3/2001 | Cotugno | G05B 19/0426 715/207 |
| 6,405,145 | B1 * | 6/2002 | Rust | G06F 9/455 702/121 |
| 7,975,233 | B2 * | 7/2011 | Macklem | G06F 8/34 715/763 |
| 8,464,204 | B1 * | 6/2013 | Thornton | G06F 11/3608 717/100 |
| 8,522,196 | B1 * | 8/2013 | Kim | G06F 11/3664 717/105 |
| 2002/0059567 | A1 * | 5/2002 | Minamide | G06F 8/51 717/151 |
| 2002/0109726 | A1 * | 8/2002 | Rogers | G06F 3/0481 715/771 |
| 2002/0129333 | A1 * | 9/2002 | Chandhoke | G06F 8/34 717/107 |
| 2003/0182601 | A1 * | 9/2003 | Richardson | G06F 11/263 714/46 |
| 2005/0086635 | A1 * | 4/2005 | Parikh | G06F 8/34 717/103 |
| 2006/0004479 | A1 * | 1/2006 | Oyama | G05B 19/4155 700/181 |
| 2007/0006194 | A1 * | 1/2007 | Mejri | G06F 11/3604 717/151 |
| 2008/0022259 | A1 * | 1/2008 | MacKlem | G06F 8/34 717/113 |
| 2008/0022264 | A1 * | 1/2008 | Macklem | G06F 8/34 717/136 |
| 2008/0098349 | A1 * | 4/2008 | Lin | G06F 8/34 717/106 |
| 2009/0308734 | A1 * | 12/2009 | Krauss | H01J 37/32935 204/192.13 |
| 2010/0280631 | A1 * | 11/2010 | Lu | G06N 3/002 700/21 |
| 2012/0317448 | A1 * | 12/2012 | Li | G06F 11/0775 714/57 |
| 2014/0058538 | A1 * | 2/2014 | Yaoita | G06F 11/323 700/28 |
| 2015/0025656 | A1 * | 1/2015 | Ono | G05B 19/052 700/20 |
| 2015/0193716 | A1 * | 7/2015 | Tanigawa | H05B 47/105 705/7.39 |
| 2015/0332167 | A1 * | 11/2015 | Kaushal | G05B 19/418 706/12 |
| 2015/0346714 | A1 * | 12/2015 | Takahashi | G05B 19/4155 700/19 |
| 2016/0070246 | A1 * | 3/2016 | Nakagawa | G05B 15/02 700/11 |
| 2016/0246279 | A1 * | 8/2016 | Amano | G05B 19/05 |
| 2016/0283256 | A1 * | 9/2016 | Standley | G06F 8/656 |
| 2016/0334776 | A1 * | 11/2016 | Hanaki | G05B 23/0272 |
| 2018/0039673 | A1 * | 2/2018 | Chen | G06F 16/9024 |
| 2018/0039709 | A1 * | 2/2018 | Chen | G06F 16/9024 |
| 2018/0039710 | A1 * | 2/2018 | Chen | G06F 16/9024 |
| 2018/0113791 | A1 * | 4/2018 | Fink | G06F 11/3664 |
| 2018/0314225 | A1 * | 11/2018 | Bisse | G05B 19/05 |

FOREIGN PATENT DOCUMENTS

| | | |
|---|---|---|
| JP | 7-295612 A | 11/1995 |
| JP | 2001-282574 A | 10/2001 |
| JP | 2002-91512 A | 3/2002 |
| JP | 2002-99312 A | 4/2002 |
| JP | 2012-83934 A | 4/2012 |
| JP | 2012-118715 A | 6/2012 |
| JP | 2012-145987 A | 8/2012 |
| JP | 2013-140513 A | 7/2013 |
| JP | 5655448 B2 | 1/2015 |

OTHER PUBLICATIONS

Stanley Bak et al., Verifying Cyber-Physical Systems by Combining Software Model Checking with Hybrid Systems Reachability, Oct. 1-7, 2016, [Retrieved on Dec. 1, 2020]. Retrieved from the internet: <URL: https://dl.acm.org/doi/pdf/10.1145/2968478.2968490> 10 Pages (1-10) (Year: 2016).*

Notification of Reason for Refusal issued in corresponding Korean Application No. 10-2019-7001430 dated May 20, 2019.

International Search Report for PCT/JP2016/075360 (PCT/ISA/210) dated Oct. 11, 2016.

Office Action dated Oct. 17, 2017 for the corresponding Taiwanese Application No. 105134396 with computer-generated English translation.

Office Action dated Jun. 16, 2020 in corresponding German Application No. 11 2016 007 069.1.

Office Action issued Dec. 31, 2020 in corresponding Chinese Application No. 201680088675.3.

Office Action dated Mar. 19, 2021 in corresponding Indian Application No. 201947005099.

* cited by examiner

Fig. 7

| | TYPE | ARGUMENT | RETURN VALUE | DEPENDENCY DESTINATION |
|---|---|---|---|---|
| INSTRUCTION 1 | ADD | A, B | P | NONE |
| INSTRUCTION 2 | MUL | C, D | Q | NONE |
| INSTRUCTION 3 | ADD | A, E | R | NONE |
| INSTRUCTION 4 | ADD | P, F | S | INSTRUCTIONS 1 |
| INSTRUCTION 5 | DIV | R, S | T | INSTRUCTIONS 3, 4 |

Fig. 8

| | EFFICIENTLY EXECUTABLE OPERATOR |
|---|---|
| ADD | ADD, SUB |
| SUB | ADD, SUB |
| MUL | NONE |
| DIV | NONE |

Fig. 9

| | NUMBER OF SIMULTANEOUSLY-EXECUTABLE INSTRUCTION |
|---|---|
| MODEL 1 | 1 |
| MODEL 2 | 2 |
| MODEL 3 | 4 |

PROGRAM EDITING DEVICE, PROGRAM EDITING METHOD, AND COMPUTER READABLE MEDIUM

TECHNICAL FIELD

The present invention relates to a program editing device, program editing method, and program editing program.

BACKGROUND ART

A software PLC (Programmable Logic Controller) programming device is disclosed in Patent Literature 1. The software PLC programming device of Patent Literature 1 converts, by using a conversion program, a sequence control program generated by a user using PLC instructions to a program using instructions in a general-purpose high-level language. Then, from the program after conversion, by using a general-purpose compiler, the software PLC programming device generates binary code (hereinafter also simply referred to as binary) for a general-purpose CPU (Central Processing Unit). This allows sequence control by a general-purpose computer.

CITATION LIST

Patent Literature

Patent Literature 1: JP H7-295612A

SUMMARY OF INVENTION

Technical Problem

In Patent Literature 1, the sequence control program using PLC instructions is converted by the conversion program to a program in the high-level language, and binary is generated by the compiler from the program after conversion. In Patent Literature 1, while the instruction execution order written in the sequence control program is maintained, the sequence control program is changed to a program in the high-level language, and binary is generated.

Therefore, the instruction execution order is not necessarily made efficient, and the required execution time of sequence control when the binary is executed may not fall within a desired required time. In this case, there is a problem in which the user has to correct the sequence control program again so that the required execution time of sequence control falls within the desired required time.

Moreover, with progression of multicore of the general-purpose CPU in recent years, a plurality of binaries can be executed in parallel, and the required execution time can be shortened. In this case, it is required to give consideration so that the process details do not contend between simultaneously-executed binaries. However, it is not easy for the user to write a desired process across a plurality of sequence control programs. Furthermore, how many binaries the sequence control program is divided into to achieve the highest efficiency varies depending on a PLC device, a processor in the PLC device, or the like. Therefore, there is a problem in which it is required to generate a sequence control program again every time the PLC device is changed.

A main object of the present invention is to solve the above-described problems. More specifically, a main object of the present invention is to generate, from a sequence control program generated by a user, a more efficient sequence control program capable of acquiring a result equivalent to that of the relevant sequence control program.

Solution to Problem

A program editing device according to the present invention includes:

a relation analyzing unit to analyze a relation between an argument and a return value between instructions of a plurality of instructions included in a sequence control program, which is a control program written in a language for sequence control; and a program editing unit to at least either change an instruction execution order of the plurality of instructions or divide the sequence control program in units of instructions, based on the relation between the argument and the return value between the instructions analyzed by the relation analyzing unit.

Advantageous Effects of Invention

According to the present invention, by at least either changing the instruction execution order in the sequence control program or dividing the sequence control program, it is possible to generate, from a sequence control program generated by the user, a more efficient sequence control program capable of acquiring a result equivalent to that of the relevant sequence control program.

BRIEF DESCRIPTION OF DRAWINGS

FIG. 7 illustrates an example of inter-variable dependency information according to Embodiment 1.

FIG. 8 illustrates an example of instruction information according to Embodiment 1.

FIG. 9 illustrates an example of PLC device information according to Embodiment 1.

DESCRIPTION OF EMBODIMENTS

Figure 1:
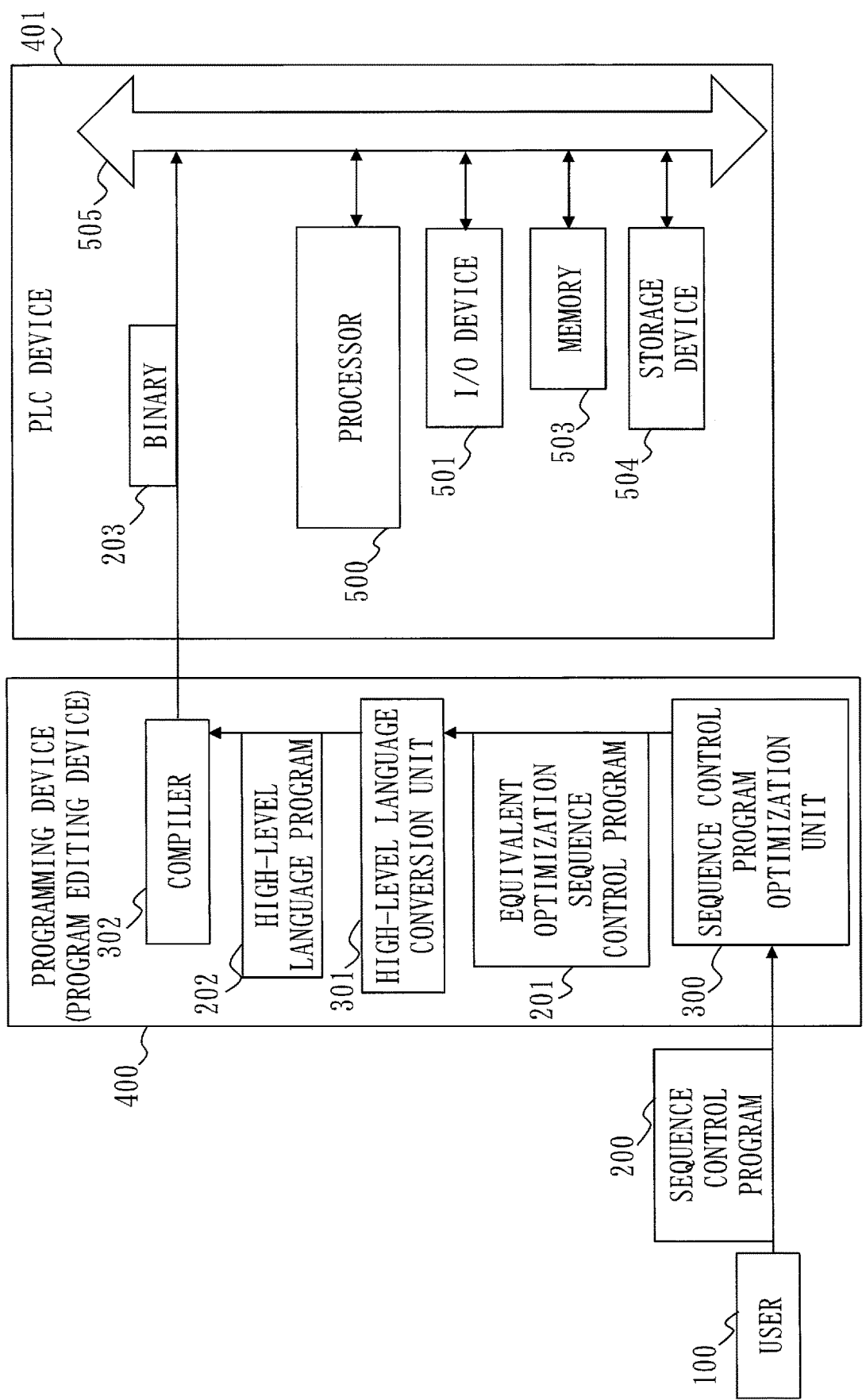
FIG. 1 illustrates a functional structure example of a programming device and a hardware structure example of a PLC device according to Embodiment 1.

In the following, embodiments of the present invention are described by using the drawings. In the following description and the drawings of the embodiments, those provided with a same reference character indicate a same portion or corresponding portion.

Embodiment 1

\*\*\*Description of Structure\*\*\*

FIG. 1 illustrates a functional structure example of a programming device 400 and a hardware structure example of a PLC device 401 according to the present embodiment.

The programming device 400 is an example of a program editing device. Also, the operation to be performed by the programming device 400 is an example of a program editing method. Also, a program for achieving the operation to be performed by the programming device 400 is an example of a program editing program.

As illustrated in FIG. 1, the programming device 400 is configured of a sequence control program optimization unit 300, a high-level language conversion unit 301, and a compiler 302.

The PLC device 401 is configured of a processor 500, an I/O (Input/Output) device 501, a memory 503, a storage device 504, and a bus 505.

In the programming device 400, the sequence control program optimization unit 300 acquires a sequence control program 200 from a user 100, and generates an equivalent optimization sequence control program 201 from the sequence control program 200. Then, the sequence control program optimization unit 300 outputs the generated equivalent optimization sequence control program 201 to the high-level language conversion unit 301.

Figure 5:
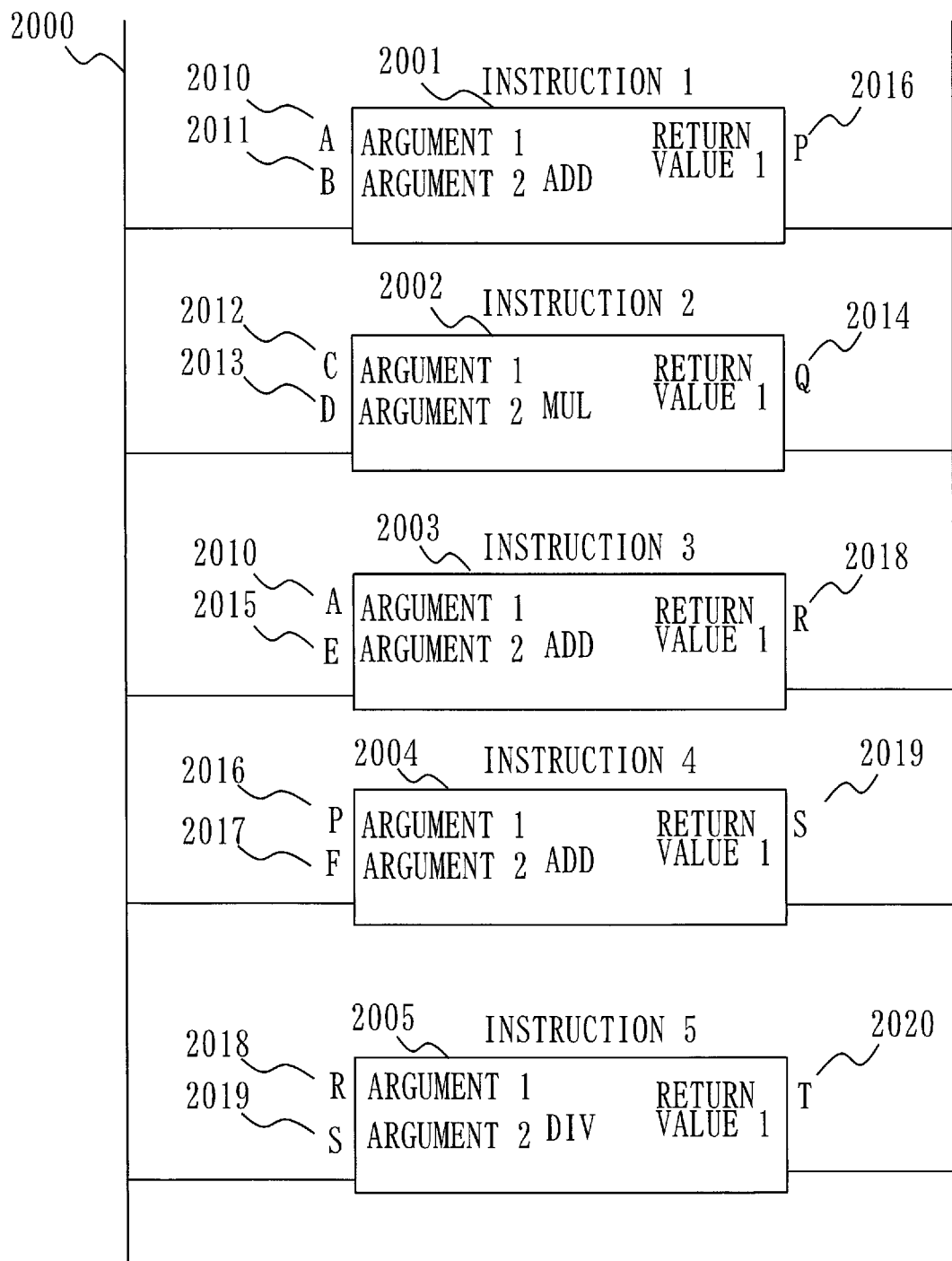
FIG. 5 illustrates an example of a sequence control program according to Embodiment 1.

The sequence control program 200 is a control program written in a language for sequence control. The sequence control program 200 includes a plurality of PLC instructions (hereinafter also simply referred to as instructions). FIG. 5 illustrates an example of the sequence control program 200. Details of FIG. 5 will be described further below. The sequence control program 200 is generated by the user 100. The user 100 is a person who causes the PLC device 401 to perform sequence control.

The equivalent optimization sequence control program 201 is a sequence control program optimized by the sequence control program optimization unit 300. Specifically, the equivalent optimization sequence control program 201 is a sequence control program with a changed instruction execution order of the plurality of PLC instructions in the sequence control program 200 or a sequence control program acquired by dividing the sequence control program 200 in units of instructions.

The high-level language conversion unit 301 acquires the equivalent optimization sequence control program 201 from the sequence control program optimization unit 300, and generates a high-level language program 202 from the equivalent optimization sequence control program 201. The high-level language conversion unit 301 then outputs the generated high-level language program 202 to the compiler 302.

The high-level language program 202 is a control program written in a general-purpose high-level language. The high-level language program 202 is a control program written in, for example, the C language.

The compiler 302 acquires the high-level language program 202 from the high-level language conversion unit 301, and generates a binary 203 from the high-level language program 202.

The binary 203 is a binary code executable by the PLC device 401.

The PLC device 401 executes the binary 203 to perform sequence control.

In the present embodiment, any type of the PLC device 401 can be used. As described above, the PLC device 401 is configured of, for example, the processor 500, the I/O device 501, the memory 503, the storage device 504, and the bus 505.

The programming device 400 and the PLC device 401 do not necessarily have to include all elements illustrated in FIG. 1, and may also include an element other than the elements illustrated in FIG. 1.

Figure 2:
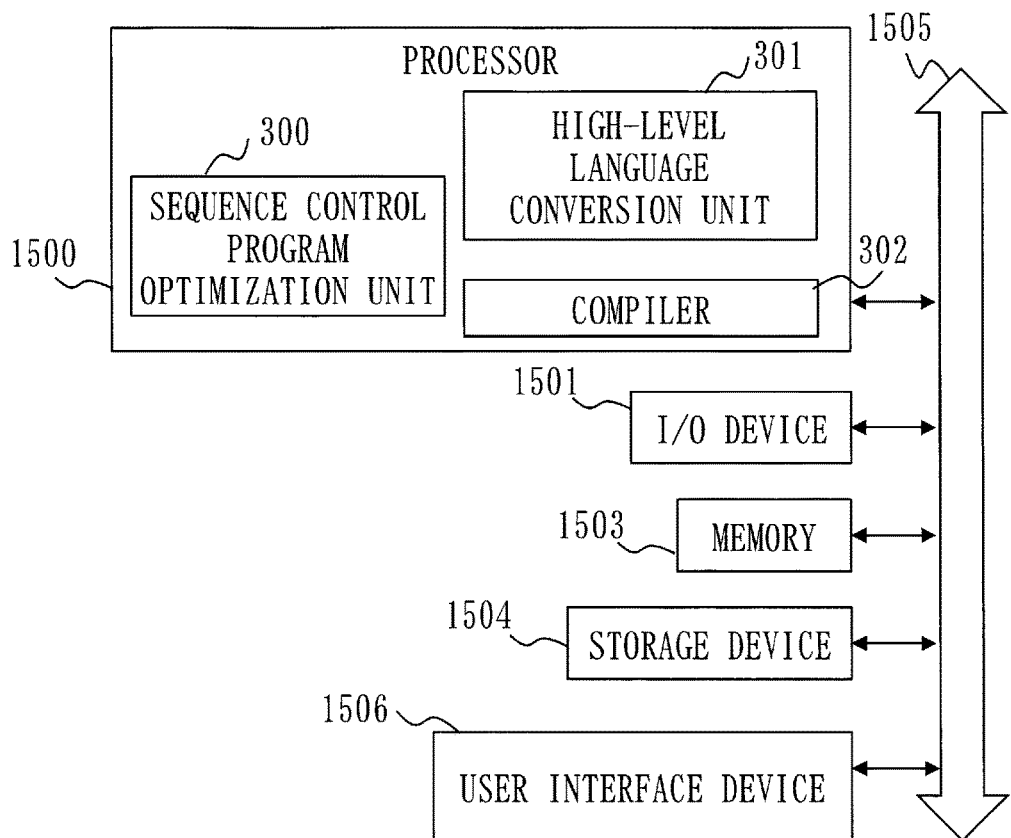
FIG. 2 illustrates a hardware structure example of the programming device according to Embodiment 1.

Also, FIG. 2 illustrates a hardware structure example of the programming device 400 according to the present embodiment.

The programming device 400 is a computer with a processor 1500, an I/O device 1501, a memory 1503, a storage device 1504, and a user interface device 1506 connected to a bus 1505.

Programs for achieving the functions of the sequence control program optimization unit 300, the high-level language conversion unit 301, and the compiler 302 illustrated in FIG. 1 are stored in the storage device 1504.

These programs are loaded from the storage device 1504 onto the memory 1503 and are executed by the processor 1500. That is, the processor 1500 performs operations of the sequence control program optimization unit 300, the high-level language conversion unit 301, and the compiler 302.

In FIG. 2, the state is schematically illustrated in which the processor 1500 executes the programs for achieving the functions of the sequence control program optimization unit 300, the high-level language conversion unit 301, and the compiler 302.

The user interface device 1506 acquires the sequence control program 200 from the user 100.

The I/O device 1501 outputs a setting value and the binary 203 generated by the compiler 302 to the PLC device 401.

Figure 3:
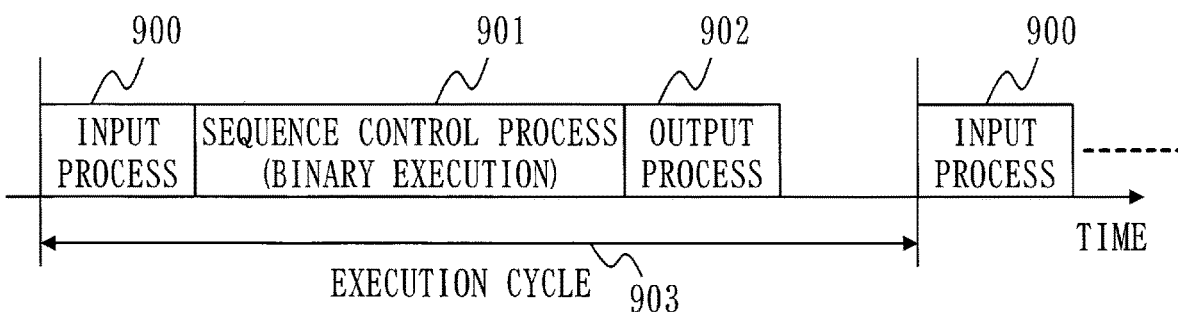
FIG. 3 illustrates a process sequence of the PLC device according to Embodiment 1.

FIG. 3 illustrates a process sequence example of the PLC device 401.

First, the PLC device 401 executes an input process 900. In the input process 900, the PLC device 401 acquires setting values required for execution of the binary 203 from the I/O device 1501 of the programming device 400. Note that the PLC device 401 has acquired the binary 203 from the I/O device 1501 before the input process 900.

Next, the PLC device 401 performs a sequence control process 901. That is, the PLC device 401 executes the binary 203 by using the setting values acquired in the input process 900.

Next, in an output process 902, the PLC device 401 outputs the execution result of the sequence control process 901 to an external device and stores the execution result in the storage device 504.

The input process 900, the sequence control process 901, and the output process 902 are repeatedly performed for each execution cycle 903.

If the execution cycle 903 is shortened to increase the number of times of performing the input process 900, the sequence control process 901, and the output process 902 in a predetermined time, the performance of the PLC device 401 can be enhanced.

Also, the behavior of the PLC device 401 is determined by the input process 900 and the output process 902. Therefore, the PLC device 401 may perform the sequence control process 901 in any manner as long as the input process 900 and the output process 902 are matched.

Figure 4:
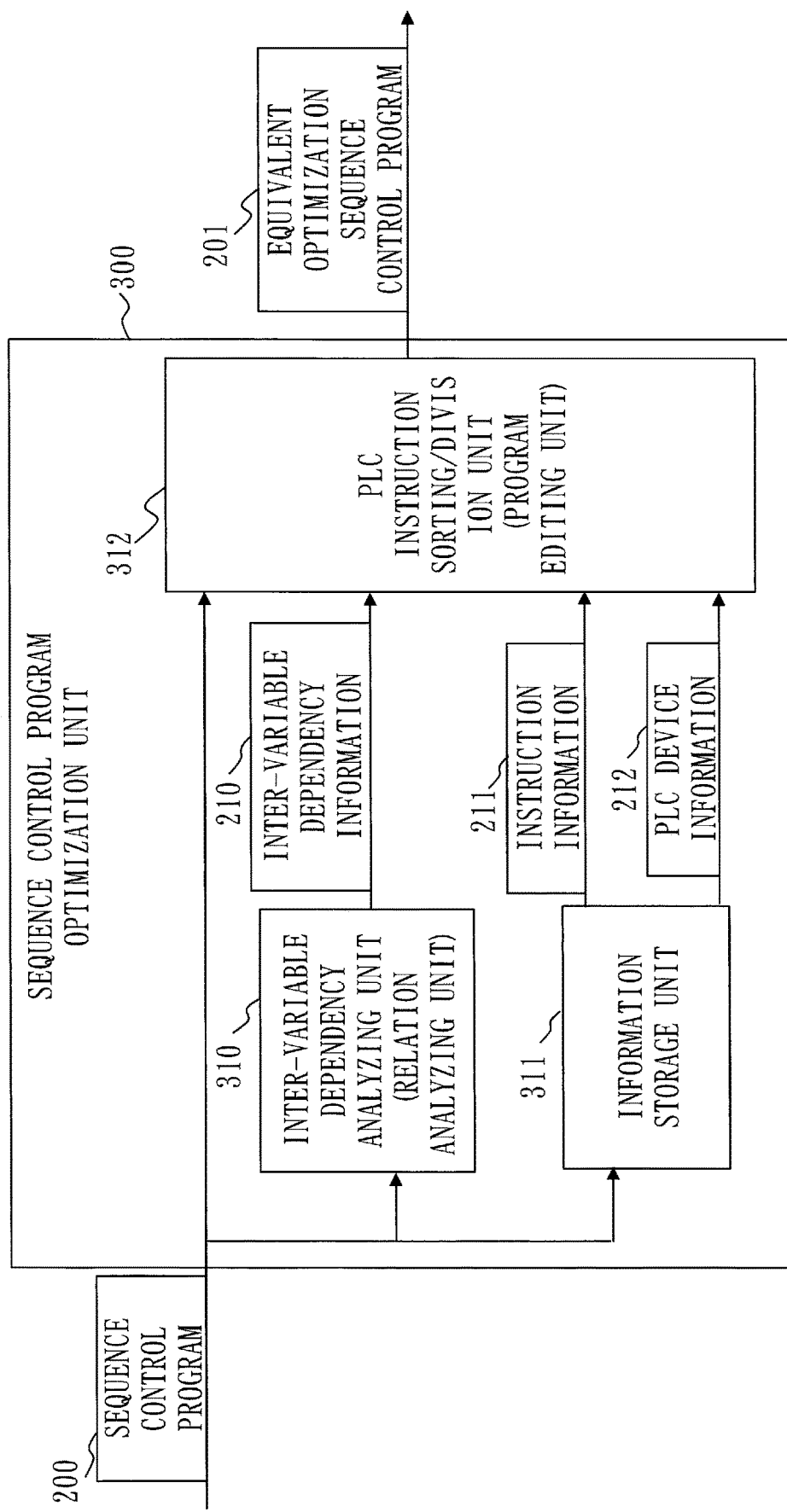
FIG. 4 illustrates a functional structure example of a sequence control program optimization unit according to Embodiment 1.

FIG. 4 illustrates a functional structure example of the sequence control program optimization unit 300.

The sequence control program optimization unit 300 is configured of an inter-variable dependency analyzing unit 310, an information storage unit 311, and a PLC instruction sorting/division unit 312.

The inter-variable dependency analyzing unit 310 analyzes a relation (hereinafter also referred to as a dependency relation) between an argument and a return value between PLC instructions included in the sequence control program 200.

Also, the inter-variable dependency analyzing unit 310 outputs inter-variable dependency information 210 indicating the dependency relation between PLC instructions. FIG. 7 illustrates an example of the inter-variable dependency information 210. Details of FIG. 7 will be described further below.

The inter-variable dependency analyzing unit 310 is an example of a relation analyzing unit. Also, the process to be performed by the inter-variable dependency analyzing unit 310 is an example of a relation analyzing process.

The information storage unit 311 stores instruction information 211 and PLC device information 212.

In the instruction information 211, for example, a combination of operators among a plurality of operators is defined with which arithmetic operation efficiency is improved with successive execution. FIG. 8 illustrates an example of the instruction information 211. While details of FIG. 8 will be described further below, each combination of operators written in FIG. 8 corresponds to a recommended operator combination. Specifically, a combination of ADD and ADD, a combination of ADD and SUB, a combination of SUB and ADD, and a combination of SUB and SUB correspond to recommended operator combinations.

In the PLC device information 212, for example, for each model of the PLC device 401, the number of PLC instructions simultaneously executable by the PLC device 401 (the number of simultaneously-executable instructions) is defined. FIG. 9 illustrates an example of the PLC device information 212. Details of FIG. 9 will be described further below.

Note that the information storage unit 311 may store, as the instruction information 211, information of a type different from that of FIG. 8 regarding PLC instructions.

Also, the information storage unit 311 may store, as the PLC device information 212, information of a type different from that of FIG. 9 regarding the PLC device 401.

The PLC instruction sorting/division unit 312 generates the equivalent optimization sequence control program 201 from the sequence control program 200 based on the inter-variable dependency information 210, the instruction information 211, and the PLC device information 212.

The equivalent optimization sequence control program 201 is a sequence control program whose process result is identical to that of the sequence control program 200 and which can be executed by the PLC device 401 at higher speed.

More specifically, the PLC instruction sorting/division unit 312 at least either changes the instruction execution order of the plurality of PLC instructions in the sequence control program 200 or divides the sequence control program 200 in units of PLC instructions to generate the equivalent optimization sequence control program 201.

When changing the instruction execution order, the PLC instruction sorting/division unit 312 specifies, from among the plurality of PLC instructions, two or more instructions in which arithmetic operation efficiency is improved by successive execution, based on a relation between an argument and a return value between PLC instructions indicated in the inter-variable dependency information 210 and an operator included in each PLC instruction in the sequence control program 200. The PLC instruction sorting/division unit 312 then changes the instruction execution order of the plurality of PLC instructions so that the specified two or more PLC instructions are successively executed.

For example, the PLC instruction sorting/division unit 312 selects any PLC instruction from the plurality of PLC instructions, and specifies one or more PLC instructions and the instruction selected (also referred to as the selected instruction), the one or more PLC instructions being other than a PLC instruction having, as an argument, a return value of a PLC instruction having a return value of the selected PLC instruction as an argument and including an operator included in a recommended operator combination in the instruction information 211 together with an operator included in the selected instruction.

Also, when dividing the sequence control program 200, the PLC instruction sorting/division unit 312 divides the sequence control program 200 into divisional programs as many as the number of simultaneously-executable instructions, based on a relation between an argument and a return value between PLC instructions indicated in the instruction information 211 and the number of instructions simultaneously executable by the PLC device 401 indicated in the PLC device information 212 (the number of simultaneously-executable instructions).

For example, the PLC instruction sorting/division unit 312 selects any PLC instruction from among the plurality of PLC instructions, and divides the sequence control program 200 so that the selected instruction selected and another PLC instruction having a return value of the selected instruction as an argument are included in the same divisional program.

The PLC instruction sorting/division unit 312 is an example of a program editing unit. Also, the process to be performed by the PLC instruction sorting/division unit 312 is an example of a program editing process.

FIG. 5 illustrates an example of the sequence control program 200. FIG. 5 illustrates a ladder program as an example of the sequence control program 200.

In the sequence control program 200 of FIG. 5, PLC instructions 2001 to 2005 are connected to a so-called ladder 2000. In the sequence control program 200 of FIG. 5, execution is performed in the order of the PLC instruction 2001, the PLC instruction 2002, the PLC instruction 2003, the PLC instruction 2004, and the PLC instruction 2005.

Variables 2010 to 2020 retain data as an argument, which is an input value of a PLC instruction, or a return value, which is an output value of a PLC instruction.

There are various types of PLC instructions, and data given as an argument is processed in accordance with each type, and data of the process result is outputted as a return value. For example, the PLC instructions 2001, 2003, and 2004 add the value of an argument 1 and the value of an argument 2 together, and output the addition value as a return value 1. The PLC instruction 2002 multiplies the value of the argument 1 by the value of the argument 2, and outputs the multiplication value as the return value 1. The PLC instruction 2005 divides the value of the argument 1 by the value of the argument 2, and outputs the division value as the return value 1.

The variable used as a return value of a PLC instruction can be used as an argument of a PLC instruction to be executed later. Also, the sequence control program 200 may include a PLC instruction in which an operation other than operations to be performed in the PLC instructions 2001 to 2005 illustrated in FIG. 5 is executed. Also, the numbers of arguments and return values of the PLC instructions may be different from those illustrated in FIG. 5. Also, either an argument or a return value may not be present.

*Description of Operation*

Next, an operation example according to the present embodiment is described.

The user 100 generates the sequence control program 200, and inputs the generated sequence control program 200 to the programming device 400. It is assumed herein that the user 100 generates the sequence control program 200 of FIG. 5.

Figure 6:
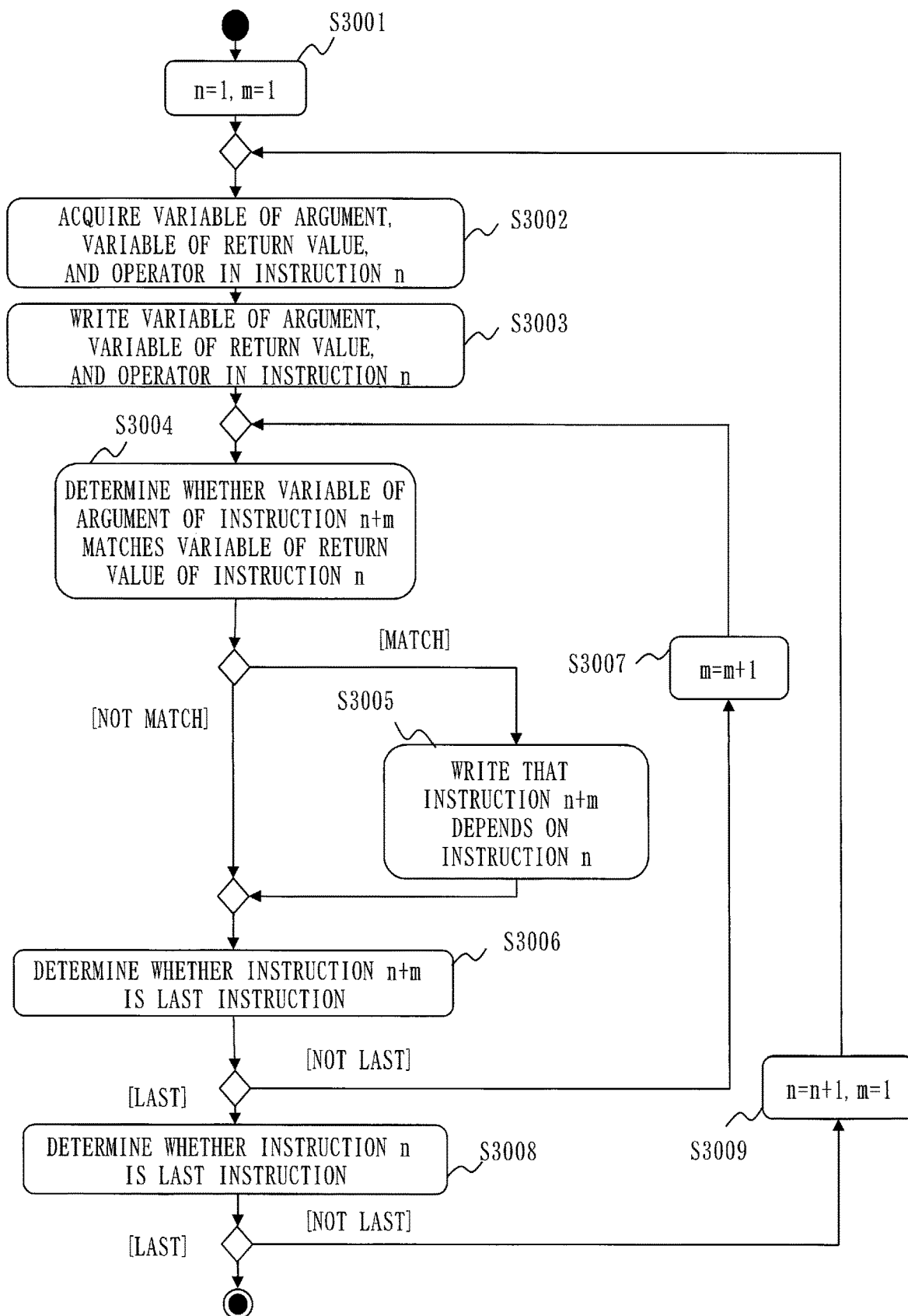
FIG. 6 is a flowchart illustrating a process of analyzing a dependency relation between instructions according to Embodiment 1.

The inter-variable dependency analyzing unit 310 of the sequence control program optimization unit 300 of the programming device 400 acquires the inter-variable dependency information 210 by performing the process illustrated in FIG. 6.

FIG. 6 illustrates an operation example of the inter-variable dependency analyzing unit 310.

In the following, the operation example of the inter-variable dependency analyzing unit 310 is described with reference to FIG. 6.

At step S3001, the inter-variable dependency analyzing unit 310 sets values of n and m, which are variables indicating a current state of the process, at 1 as initial values.

Next at step S3002, the inter-variable dependency analyzing unit 310 acquires a variable used as an argument, a variable used as a return value, and an operator in an n-th PLC instruction (hereinafter referred to as an instruction n) on the sequence control program 200.

Next at step S3003, the inter-variable dependency analyzing unit 310 writes the variable of the argument, the variable of the return value, and the operator acquired at step S3002 in the inter-variable dependency information 210.

Next at step S3004, the inter-variable dependency analyzing unit 310 determines whether a variable used as an argument of an n+m-th PLC instruction (hereinafter referred to as an instruction n+m) on the sequence control program 200 matches the variable of the return value of the instruction n acquired at step S3002.

When the variable used as an argument of the n+m instruction matches the variable of the return value of the instruction n, the inter-variable dependency analyzing unit 310 writes in the inter-variable dependency information 210 that the instruction n+m depends on the instruction n at step S3005, and proceeds to step S3006.

At step S3006, the inter-variable dependency analyzing unit 310 determines whether the instruction n+m is the last PLC instruction in the sequence control program 200.

When the instruction n+m is not the last PLC instruction in the sequence control program 200, the inter-variable dependency analyzing unit 310 increments the value of the variable m by 1 at step S3007, and proceeds to step S3004.

On the other hand, when the instruction n+m is the last PLC instruction in the sequence control program 200, the inter-variable dependency analyzing unit 310 determines whether the instruction n is the last PLC instruction in the sequence control program 200 at step S3008.

When the instruction n is the last PLC instruction in the sequence control program 200, the inter-variable dependency analyzing unit 310 ends the process.

On the other hand, when the instruction n is not the last PLC instruction in the sequence control program 200, the inter-variable dependency analyzing unit 310 increments the value of the variable n by 1 and also resets the value of the variable m at 1 at step S3009, and proceeds to step S3002.

FIG. 7 illustrates an example of the inter-variable dependency information 210 acquired by the inter-variable dependency analyzing unit 310 performing the process illustrated in FIG. 6 on the sequence control program 200 of FIG. 5.

In FIG. 7, an instruction 1 to an instruction 5 are the instruction 1 to the instruction 5 illustrated in FIG. 5.

In a type field, an operator included in each PLC instruction is written.

In an argument field, a variable for use as an argument of each PLC instruction is written.

In a return value field, a variable for use as a return value of each PLC instruction is written.

In a dependency destination field, another PLC instruction on which each PLC instruction depends is written.

Figure 10:
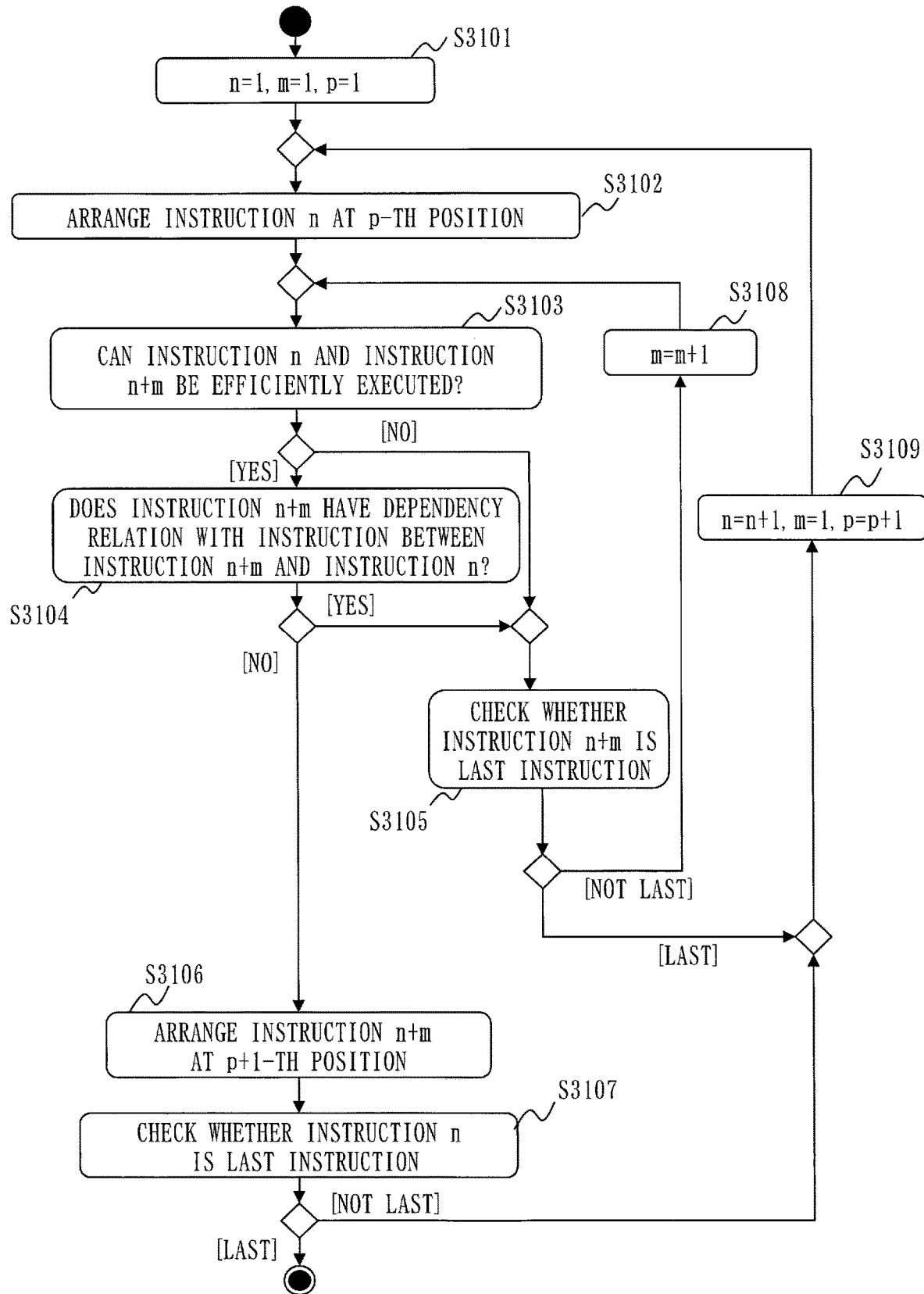
FIG. 10 is a flowchart illustrating a process of changing an instruction execution order according to Embodiment 1.

FIG. 10 illustrates a process of changing the instruction execution order by the PLC instruction sorting/division unit 312.

In the following, an operation example of the PLC instruction sorting/division unit 312 is described with reference to FIG. 10.

At step S3101, the PLC instruction sorting/division unit 312 sets the values of the variables n, m, and p indicating a current state of the process at 1 as initial values.

Next at step S3102, the PLC instruction sorting/division unit 312 arranges an n-th PLC instruction (hereinafter referred to as an instruction n) on the sequence control program 200 at a p-th position in the equivalent optimization sequence control program 201. Note that the instruction n corresponds to a selected instruction.

Next at step S3103, the PLC instruction sorting/division unit 312 determines whether an n+m-th PLC instruction (hereinafter referred to as an instruction n+m) on the sequence control program 200 can be efficiently executed together with the instruction n.

More specifically, the PLC instruction sorting/division unit 312 refers to the instruction information 211 to determine whether the instruction n and the instruction n+m can be efficiently executed.

FIG. 8 illustrates an example of the instruction information 211. In the example of FIG. 8, when the operator included in the instruction n is ADD, the instruction n and the instruction n+m can be efficiently executed if the operator of the instruction n+m is ADD or SUB. Similarly, when the operator included in the instruction n is SUB, the instruction n and the instruction n+m can be efficiently executed if the operator of the instruction n+m is ADD or SUB. If not applied to these, the instruction n and the instruction n+m cannot be efficiently executed.

When the instruction n and the instruction n+m can be efficiently executed, the PLC instruction sorting/division unit 312 determines at step S3104 whether the instruction n+m has a dependency relation with an instruction between the instruction n and the instruction n+m on the sequence control program 200, that is, whether the instruction n+m have, as an argument, a return value of an instruction having a return value of the instruction n as an argument. Note that the PLC instruction sorting/division unit 312 makes a determination at step S3104 by referring to the inter-variable dependency information 210.

When the instruction n+m has a dependency relation with the instruction between the instruction n and the instruction n+m, the PLC instruction sorting/division unit 312 determines at step S3105 whether the instruction n+m is the last PLC instruction in the sequence control program 200.

When the instruction n+m is not the last instruction, the PLC instruction sorting/division unit 312 increments the value of the variable m by 1 at step S3108, and proceeds to step S3103.

Also, when the instruction n+m is the last instruction, the PLC instruction sorting/division unit 312 increments the value of the variable n and the value of a variable p each by 1 and resets the value of the variable m at 1 at step S3109, and proceeds to step S3102.

At step S3104, when the instruction n+m does not have a dependency relation with the instruction between the instruction n and the instruction n+m, the PLC instruction sorting/division unit 312 arranges the instruction n+m at a p+1-th position in the equivalent optimization sequence control program 201 at step S3106.

Next at step S3107, the PLC instruction sorting/division unit 312 determines whether the instruction n is the last PLC instruction in the sequence control program 200.

When the instruction n is the last instruction, the PLC instruction sorting/division unit 312 ends the process.

On the other hand, when the instruction n is not the last instruction, the PLC instruction sorting/division unit 312 proceeds to step S3109.

Figure 12:
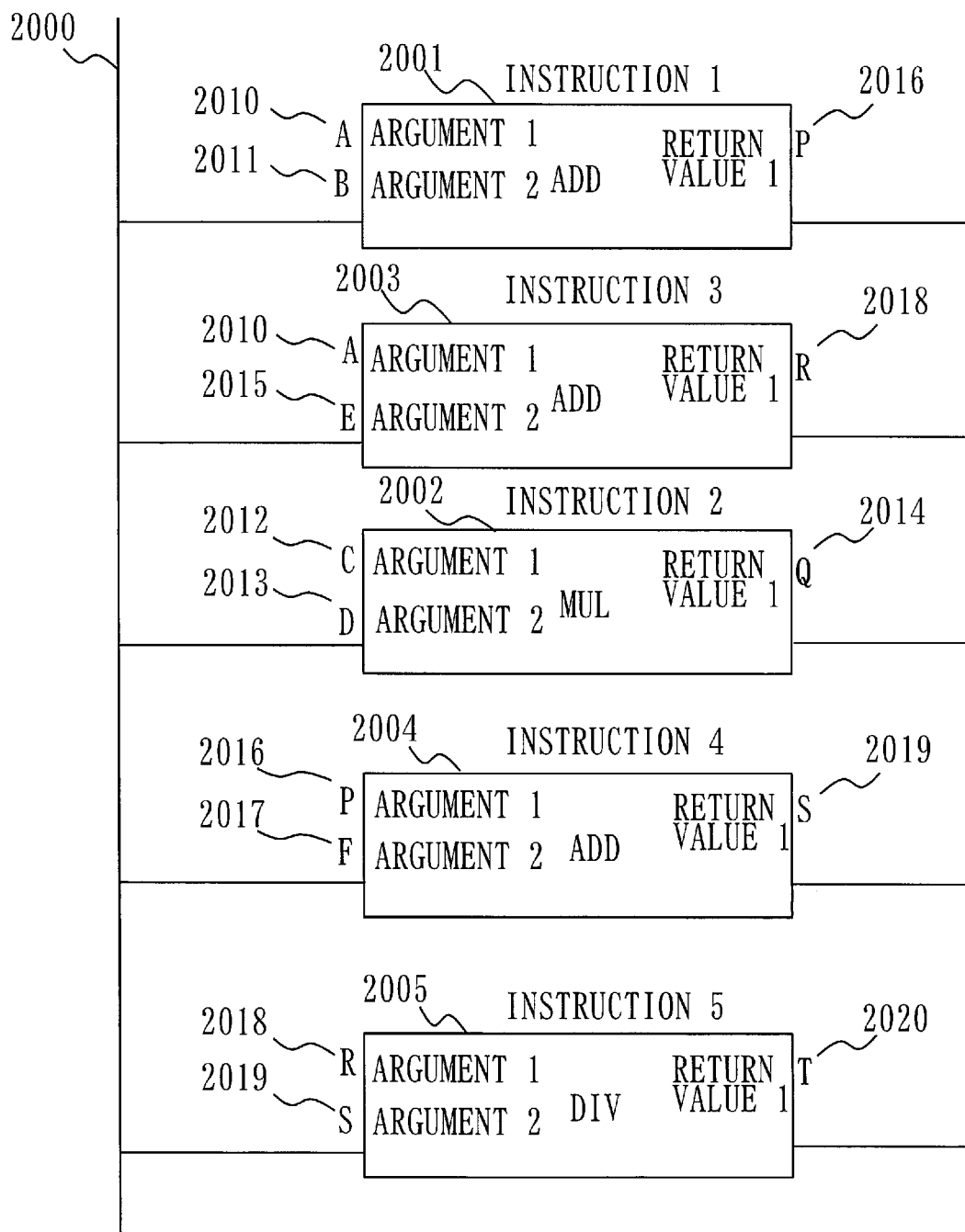
FIG. 12 illustrates an example of an equivalent optimization sequence control program according to Embodiment 1.

FIG. 12 illustrates an example of the equivalent optimization sequence control program 201 acquired by the process of FIG. 10.

Compared with the sequence control program 200 of FIG. 5, in the equivalent optimization sequence control program 201 of FIG. 12, the instruction execution order of the PLC instructions is changed. Specifically, the instruction execution order is changed so that the PLC instruction 2003 is executed prior to the PLC instruction 2002.

The operator of the PLC instruction 2003 and the operator of the PLC instruction 2001 are both ADD, and a combination of ADD and ADD corresponds to a combination of efficiently executable operators according to the instruction information 211 of FIG. 8. And, the PLC instruction 2003 does not depend on the PLC instruction 2002 between the PLC instruction 2003 and the PLC instruction 2001.

Therefore, the PLC instruction 2003 is arranged next the PLC instruction 2001 at step S3106 of FIG. 10. As a result, the equivalent optimization sequence control program 201 of FIG. 12 is acquired.

Figure 11:
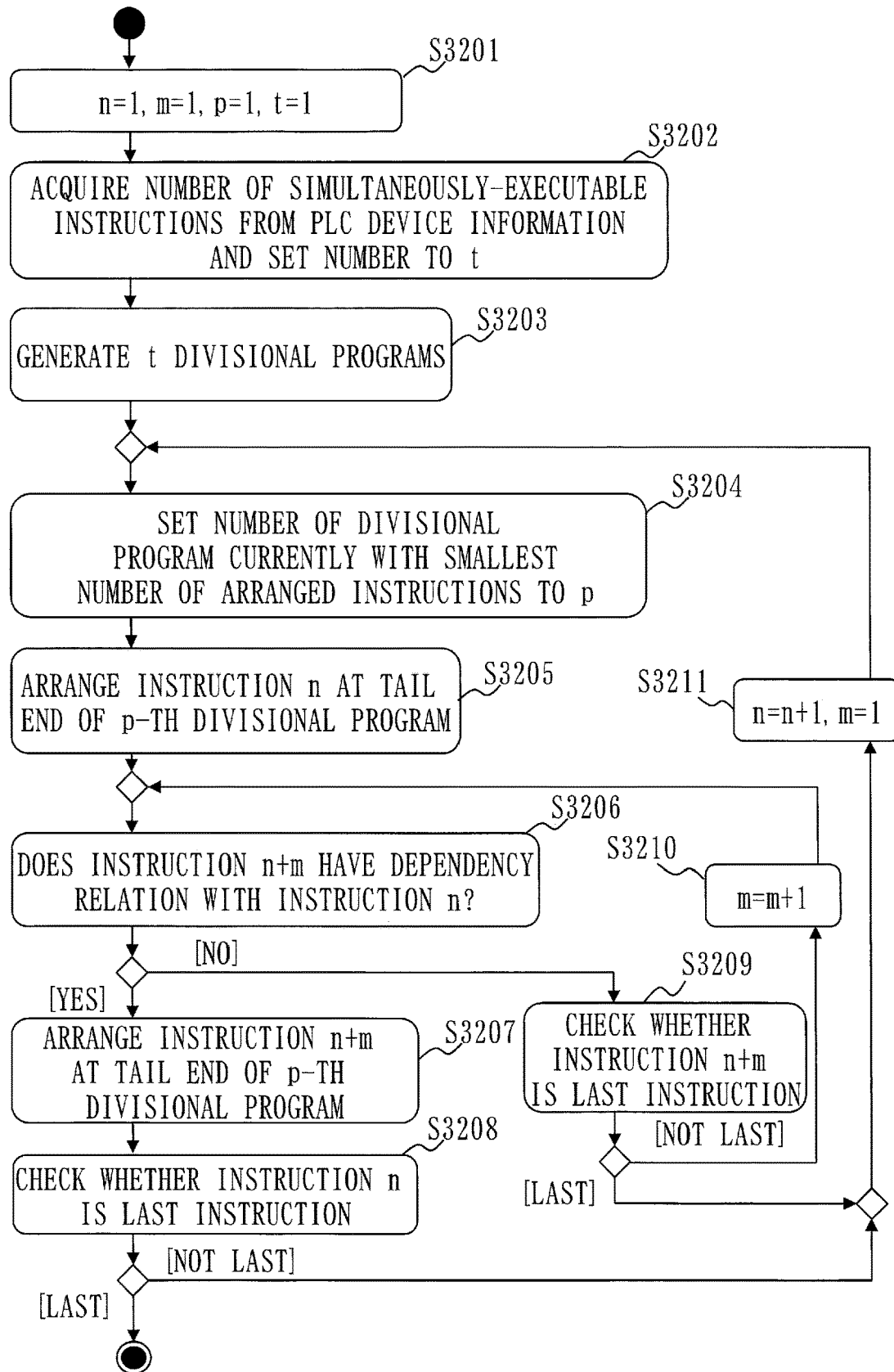
FIG. 11 is a flowchart illustrating a process of dividing the sequence control program according to Embodiment 1.

FIG. 11 illustrates a process of dividing the sequence control program by the PLC instruction sorting/division unit 312.

In the following, an operation example of the PLC instruction sorting/division unit 312 is described with reference to FIG. 11.

At step S3201, the PLC instruction sorting/division unit 312 sets values of n, m, p, and t, which are variables indicating a current state of the process, at 1 as initial values. Note that the variable t may not be set at 1.

At step S3202, the PLC instruction sorting/division unit 312 acquires the number of simultaneously-executable instructions of the PLC device 401 as a target from the PLC device information 212, and sets the acquired number of simultaneously-executable instructions to the variable t.

As described above, the PLC device information 212 is as illustrated in FIG. 9. In the PLC device information 212, how many PLC instructions the PLC device 401 can simultaneously execute is defined for each model of the PLC device 401.

When the model of the PLC device 401 as a current target is a model 2, the PLC instruction sorting/division unit 312 acquires 2 as the number of simultaneously-executable instructions of the relevant PLC device 401.

Next at step S3203, the PLC instruction sorting/division unit 312 generates t divisional programs, which are sequence control programs as division destinations. Also, the PLC instruction sorting/division unit 312 sets numbers from 0 to t−1 to the respective divisional programs.

Note that each divisional program is blank at this moment.

Next at step S3204, among the t divisional programs, the PLC instruction sorting/division unit 312 specifies a divisional program with a smallest number of PLC instructions currently arranged, and sets a number of the relevant divisional program to the variable p.

Next at step S3205, the PLC instruction sorting/division unit 312 arranges an n-th PLC instruction (hereinafter referred to as an instruction n) in the sequence control program 200 at the tail end of the p-th divisional program.

Next at step S3206, the PLC instruction sorting/division unit 312 determines whether an n+m-th PLC instruction (hereinafter referred to as an instruction n+m) in the sequence control program 200 has a dependency relation with the instruction n. That is, with reference to the inter-variable dependency information 210, the PLC instruction sorting/division unit 312 determines whether the variable of the argument of the instruction n+m is equal to the variable of the return value of the instruction n.

When the instruction n+m and the instruction n have a dependency relation, the PLC instruction sorting/division unit 312 arranges the instruction n+m at the tail end of the p-th divisional program at step S3207.

Next, the PLC instruction sorting/division unit 312 determines at step S3208 whether the instruction n is the last PLC instruction in the sequence control program 200.

When the instruction n is the last PLC instruction, the PLC instruction sorting/division unit 312 ends the process.

On the other hand, when the instruction n is not the last PLC instruction, the PLC instruction sorting/division unit 312 proceeds to step S3211.

When the instruction n+m and the instruction n do not have a dependency relation at step S3206, the PLC instruction sorting/division unit 312 determines at step S3209 whether the instruction n+m is the last PLC instruction in the sequence control program 200.

When the instruction n+m is not the last PLC instruction, the PLC instruction sorting/division unit 312 increments the value of the variable m by 1 at step S3210, and proceeds to step S3206.

On the other hand, when the instruction n+m is the last PLC instruction, the PLC instruction sorting/division unit 312 increments the value of the variable n by 1 and initializes the value of the variable m at 1 at step S3211, and proceeds to step S3204.

Figure 13:
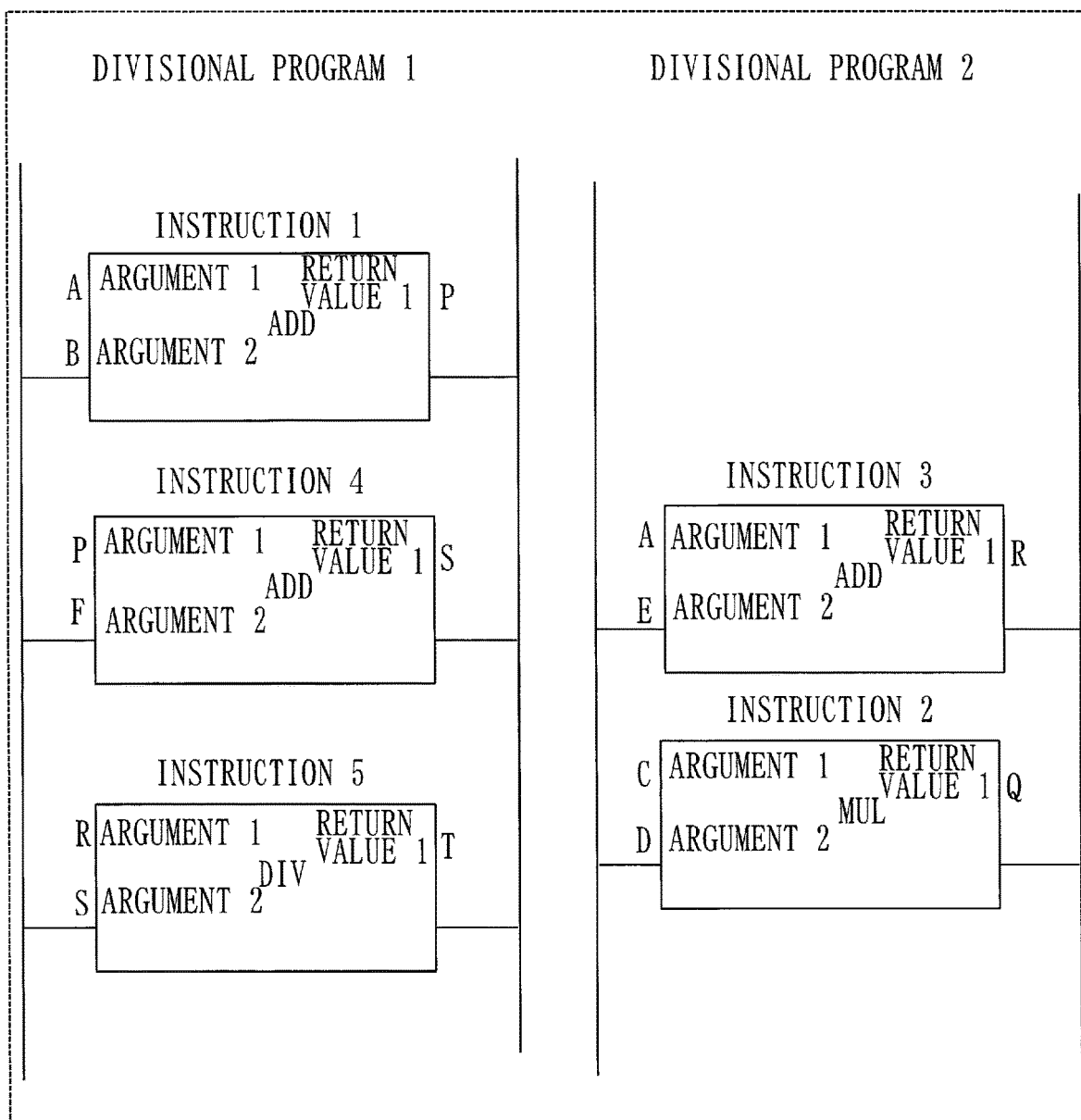
FIG. 13 illustrates an example of the equivalent optimization sequence control program according to Embodiment 1.

FIG. 13 illustrates an example of the equivalent optimization sequence control program 201 acquired by the process of FIG. 11.

In FIG. 13, the sequence control program 200 illustrated in FIG. 5 is divided into two, that is, a divisional program 1 and a divisional program 2.

When the PLC device 401 can simultaneously execute two programs, by concurrently executing the divisional program 1 and the divisional program 2 illustrated in FIG. 13, the required execution time can be shortened.

As described above, in the programming device 400 according to the present embodiment, optimization of the sequence control program (changing the instruction execution order and/or dividing the sequence control program 200) can be performed.

The PLC instruction sorting/division unit 312 may only either change the instruction execution order of FIG. 10 or divide the sequence control program of FIG. 11. Also, the PLC instruction sorting/division unit 312 may change the instruction execution order of FIG. 10 and divide the sequence control program of FIG. 11 both. When changing the instruction execution order of FIG. 10 and dividing the sequence control program of FIG. 11 both, the PLC instruction sorting/division unit 312 may divide the sequence control program of FIG. 11 after changing the instruction execution order of FIG. 10 of the sequence control program. Also, the PLC instruction sorting/division unit 312 may change the instruction execution order of FIG. 10 of the sequence control program (divisional program) after dividing the sequence control program of FIG. 11.

Description of Effects of Embodiment

According to the present embodiment, by at least either changing the instruction execution order in the sequence control program or dividing the sequence control program, it is possible to generate, from a sequence control program generated by the user, a more efficient sequence control program capable of acquiring a result equivalent to that of the relevant sequence control program.

Therefore, by writing only a desired process irrespectively of the structure of the PLC device, the user can acquire a program capable of sequence control at the highest speed.

Embodiment 2

Figure 14:
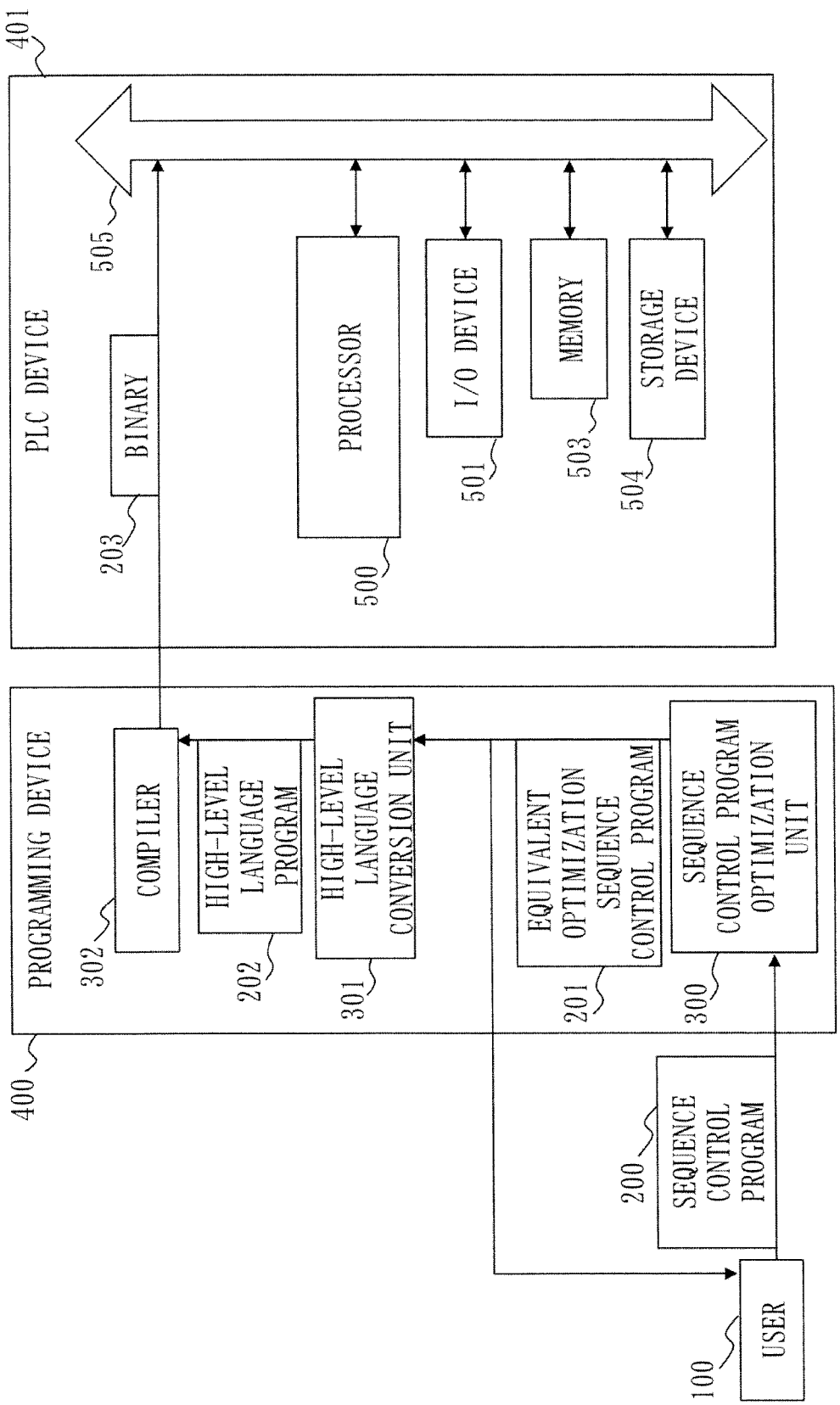
FIG. 14 illustrates a functional structure example of a programming device and a hardware structure example of a PLC device according to Embodiment 2.

FIG. 14 illustrates a functional structure example of a programming device 400 and a hardware structure example of a PLC device 401 according to the present embodiment.

The hardware structure example of the PLC device 401 is identical to that illustrated in FIG. 1, and therefore its description is omitted.

In the present embodiment, the programming device 400 presents the equivalent optimization sequence control program 201 generated by the sequence control program optimization unit 300 to the user 100. More specifically, the user interface device 1506 illustrated in FIG. 2 displays the equivalent optimization sequence control program 201.

When the sequence control program 200 generated by the user 100 is erroneous, the equivalent optimization sequence control program 201 is also erroneous. Therefore, when the sequence control program 200 is erroneous, the PLC device 401 does not operate in a manner as the user desires.

In the present embodiment, the equivalent optimization sequence control program 201 is presented to the user 100, and therefore the user 100 can analyze the PLC instructions in the equivalent optimization sequence control program 201 one by one to check the operation of the PLC device 401.

In the present embodiment, the sequence control program 200 written with the PLC instructions are converted into the equivalent optimization sequence control program 201 similarly written with the PLC instructions, and the equivalent optimization sequence control program 201 is presented to the user 100. This allows the user 100 to check the optimized sequence control program even if the user 100 only understands the PLC instructions and does not understand a high-level general-purpose language.

While the embodiments of the present invention have been described above, these two embodiments may be implemented as combined.

Alternatively, one of these two embodiments may be partially implemented.

Still alternatively, these two embodiments may be implemented as partially combined.

Note that the present invention is not limited to these embodiments and can be variously changed as required.

*Description of Hardware Structure*

Finally, additional description of the hardware structure of the programming device 400 is made.

The processor 1500 illustrated in FIG. 2 is an IC (Integrated Circuit) for performing processing.

The processor 1500 is a CPU (Central Processing Unit), DSP (Digital Signal Processor), or the like.

The memory 1503 is a RAM (Random Access Memory).

The storage device 1504 is a ROM (Read Only Memory), flash memory, HDD (Hard Disk Drive), or the like.

The I/O device 1501 is a receiver for receiving data and a transmitter for transmitting data and, for example, is a communication chip or NIC (Network Interface Card).

The user interface device 1506 is a mouse, keyboard, display, or the like.

An OS (Operating System) is also stored in the storage device 1504.

And, at least part of the OS is loaded onto the memory 1503 and is executed by the processor 1500.

While executing at least part of the OS, the processor 1500 executes programs for achieving the functions of the sequence control program optimization unit 300, the high-level language conversion unit 301, and the compiler 302.

With the processor 1500 executing the OS, task management, memory management, file management, communication control, and so forth are performed.

Also, the programming device 400 may include a plurality of processors which replace the processor 1500.

Also, information, data, signal values, and variable values indicating the results of the processes of the sequence control program optimization unit 300, the high-level language conversion unit 301, and the compiler 302 are stored in at least any of the memory 1503, the storage device 1504, and a register and cache memory in the processor 1500.

Also, the programs for achieving the functions of the sequence control program optimization unit 300, the high-level language conversion unit 301, and the compiler 302 may be stored in a portable storage medium such as a magnetic disc, flexible disc, optical disc, compact disc, Blu-ray (a registered trademark) disc, or DVD.

Also, the "units" of the sequence control program optimization unit 300 and the high-level language conversion unit 301 may be read as "circuits", "steps", "procedures", or "processes".

Also, the programming device 400 may be implemented by an electronic circuit such as a logic IC (Integrated Circuit), GA (Gate Array), ASIC (Application Specific Integrated Circuit), or FPGA (Field-Programmable Gate Array).

Note that the processor and the above-described electronic circuits are also collectively referred to as processing circuitry.

REFERENCE SIGNS LIST

100: user; 200: sequence control program; 201: equivalent optimization sequence control program; 202: high-level language program; 203: binary; 210: inter-variable dependency information; 211: instruction information; 212: PLC device information; 300: sequence control program optimization unit; 301: high-level language conversion unit; 302: compiler; 310: inter-variable dependency analyzing unit; 311: information storage unit; 312: PLC instruction sorting/division unit; 400: programming device; 401: PLC device; 500: processor; 501: I/O device; 503: memory; 504: storage device; 505: bus; 1500: processor; 1501: I/O device; 1503: memory; 1504: storage device; 1505: bus; 1506: user interface device

The invention claimed is:

1. A program editing device comprising:
processing circuitry to:
analyze a relation between an argument and a return value between instructions of a plurality of instructions included in a sequence control program, which is a pre-compiled control program written in a language for sequence control, the plurality of instructions being sequenced according to a first instruction execution order; and
at least either change the first instruction execution order of the plurality of instructions to a second instruction execution order or divide the sequence control program into simultaneously executable units of instructions, based on the relation between the argument and the return value between the instructions analyzed,
wherein execution of the plurality of instructions according to the second instruction execution order achieves an equivalent result more efficiently than execution of the plurality of instructions according to the first instruction execution order,
wherein the processing circuitry changes the first instruction execution order of the plurality of instructions based on the relation between the argument and the return value between the instructions analyzed and an operator included in each instruction, and
wherein the processing circuitry specifies, from among the plurality of instructions, two or more instructions in which arithmetic operation efficiency is improved by successive execution, based on the relation between the argument and the return value between the instructions analyzed and the operator included in each instruction, and changes the instruction execution order of the plurality of instructions so that the specified two or more instructions are successively executed.

2. The program editing device according to claim 1, further comprising:
a memory to store instruction information in which a combination of operators with which arithmetic operation efficiency is improved by successive execution is defined as a recommended operator combination, wherein
the processing circuitry
selects any instruction from the plurality of instructions, and
specifies one or more instructions and the selected instruction selected, the one or more instructions being other than an instruction having, as an argument, a return value of an instruction having a return value of the selected instruction as an argument and including an operator included in the recommended operator combination in the instruction information together with an operator included in the selected instruction.

3. A program editing device comprising:
processing circuitry to:
analyze a relation between an argument and a return value between instructions of a plurality of instructions included in a sequence control program, which is a control program written in a language for sequence control; and
at least divide the sequence control program in the units of instructions, based on the analyzed relation between the argument and the return value between the instructions and a number of simultaneously-executable instructions, which is a number of instructions simultaneously executable by a PLC (Programmable Logic Controller) device.

4. The program editing device according to claim 3, wherein
the processing circuitry divides the sequence control program into divisional programs as many as the number of simultaneously-executable instructions.

5. The program editing device according to claim 4, wherein
the processing circuitry selects any instruction from the plurality of instructions, and divides the sequence control program so that the selected instruction selected and another instruction having a return value of the selected instruction as an argument are included in a same divisional program.

6. A program editing method comprising:
analyzing, by a processor, a relation between an argument and a return value between instructions of a plurality of instructions included in a sequence control program, which is a pre-compiled control program written in a language for sequence control, the plurality of instructions being sequenced according to a first instruction execution order; and
by the processor, at least either changing the first instruction execution order of the plurality of instructions to a second instruction execution order or dividing the sequence control program into simultaneously executable units of instructions, based on the analyzed relation between the argument and the return value between the instructions,
wherein execution of the plurality of instructions according to the second execution order achieves an equivalent result more efficiently than execution of the plurality of instructions according to the first execution order,
wherein the processor changes the first instruction execution order of the plurality of instructions based on the relation between the argument and the return value between the instructions analyzed and an operator included in each instruction, and
wherein the processor specifies, from among the plurality of instructions, two or more instructions in which arithmetic operation efficiency is improved by successive execution, based on the relation between the argument and the return value between the instructions analyzed and the operator included in each instruction, and changes the instruction execution order of the plurality of instructions so that the specified two or more instructions are successively executed.

7. A non-transitory computer readable medium storing a program editing program that causes a computer to execute:
a relation analyzing process of analyzing a relation between an argument and a return value between instructions of a plurality of instructions included in a sequence control program, which is a pre-compiled control program written in a language for sequence control, the plurality of instructions being sequenced according to a first instruction execution order; and
a program editing process of at least either changing the first instruction execution order of the plurality of instructions to a second instruction execution order or dividing the sequence control program into simultaneously executable units of instructions, based on the relation between the argument and the return value between the instructions analyzed by the relation analyzing process, wherein execution of the plurality of instructions according to the second execution order achieves an equivalent result more efficiently than execution of the plurality of instructions according to the first execution order, wherein the program editing process changes the first instruction execution order of the plurality of instructions based on the relation between the argument and the return value between the instructions analyzed and an operator included in each instruction, and wherein the program editing process specifies, from among the plurality of instructions, two or more instructions in which arithmetic operation efficiency is improved by successive execution, based on the relation between the argument and the return value between the instructions analyzed and the operator included in each instruction, and changes the instruction execution order of the plurality of instructions so that the specified two or more instructions are successively executed.

\* \* \* \* \*